United States Patent [19]
Sollars

[11] 4,020,715
[45] May 3, 1977

[54] SPEED REDUCER AND HOUSING THEREFOR

[75] Inventor: Merle L. Sollars, Wellington, Ill.

[73] Assignee: Steel Belt, Inc., Wellington, Ill.

[22] Filed: Mar. 27, 1975

[21] Appl. No.: 562,638

[52] U.S. Cl. .............................. 74/606 R; 74/425
[51] Int. Cl.² .......................................... F16H 57/02
[58] Field of Search .................................... 74/606

[56] References Cited
UNITED STATES PATENTS

| | | | |
|---|---|---|---|
| 2,623,406 | 12/1952 | Hansen | 74/606 |
| 2,641,139 | 6/1953 | Beisner | 74/606 |
| 2,734,393 | 2/1956 | Luenberger | 74/606 |
| 3,521,504 | 7/1970 | Jorg | 74/606 |

*Primary Examiner*—Samuel Scott
*Assistant Examiner*—Wesley S. Ratliff, Jr.
*Attorney, Agent, or Firm*—Fitch, Even, Tabin & Luedeka

[57] ABSTRACT

A speed reducer is contained in a modular housing that includes a body having a chamber for mounting the gear train and power shafts and which is open at two opposing ends, an end member for mounting the speed reducer and forming an oiltight seal with the body at one of the ends, and another end member forming an oiltight seal with the body at the other of the ends.

4 Claims, 10 Drawing Figures

SPEED REDUCER AND HOUSING THEREFOR

The present invention relates generally to speed reducer mechanisms and more particularly to gear speed reducers and the housing and mounting arrangements therefor.

Speed reducers, particularly gear drives, are well known in the mechanical power transmission field. Where large forces are to be transmitted in a gear train, worm gearing is often used and includes a pair of gears whose shafts are at right angles to one another. In such, the smaller of the gears is known as the worm. The other gear is the worm gear or wheel and has a plurality of separate teeth. The wheel is driven by the rotation of the worm with which it meshes. The rotational speeds of the associated shafts are a function of the number of teeth on the gear and the number of threads on the worm. The worm may be single or multiple threaded.

An enclosed gear drive comprises at least one pair of gears enclosed in a casing or housing. The housing usually is made of metal, such as cast iron, but it can be made of other suitable materials. The housing usually forms a reservoir for a lubricant to both lubricate the gears, bearings, and seals and to serve as a coolant for the unit. The housing forms a rigid support to mount the gears, bearings, seals and their associated parts. Such housings usually incorporate some form of mounting feet to secure the enclosed gear drive in a fixed position in relation to associated driven apparatus and associated driving or power source.

In one form, an enclosed gear drive speed reducer is contained in a housing that is independent of both the driving or power source and the driven apparatus. Both the driving and the driven devices may be connected to the shafts of the reducer by some form of flexible coupling. Otherwise the connections are effected through another form of direct drive, or by spur gearing, or by belt or chain drives.

In another form, the gear speed reducer is contained in a housing that is adapted to mount an electric drive motor, and in this instance the output shaft of the motor is connected directly to the worm, eliminating external gears, belts, pulleys, chains or the like.

Just as there is a general market for certain sizes and types in other areas of industry, there is a general market for reducers having certain horsepower ratings, reduction ratios, and other operational specifications in the gear speed reducer industry. These encompass a variety of input speeds, output ratios, and horsepower ratings provided in structural configurations that include worm top models, worm bottom models, and vertical shaft models. Hence, a manufacturer designs a certain number of models, sizes and types and then produces these specific units. The investment of the manufacturer in machinery, patterns and tools is likely to be concentrated on the high production of these so-called standard products. The starting point in the design of these standard units usually is the center to center distance of one gear to the mating gear. This center distance determines the dimensions of an associated housing and becomes fixed for that housing. Thus, the pitch diameter of the standard gears also becomes fixed.

As a result, for a given center distance of standard gears, the horsepower-torque capacity tends to become fixed within a narrow range, depending upon materials used, heat treatment of the gears, tooth size of the gears, and the like. Associated components, such as bearings, shafts, and seals, are then selected and used with the gears to form the remaining elements of the gear speed reducer. The associated housing mounts and holds the alignment of these various components and forms the lubricating reservoir.

These design procedures tend to fix all of the dimensions, and the manufacturer has little, if any, dimensional freedom in his final product. Further, because of differing design concepts among manufacturers, it is unlikely that the products of any two manufacturers have comparative dimensions that are exactly the same. Moreover, one manufacturer may deliberately design his products to be dimensionally different from those of his competitors.

Consequently, there are no known housing design standards or dimensional standards for gear speed reducer units. This is true even though the center distance between gears may be the same on units of a given rating. There have been various moves in the past to provide gear speed reducers with interchangeable gears and operating components. Such has involved the design, rating and service classification of the gears, standards for which have been established by the American Gear Manufacturers Association (AGMA).

The AGMA, however, has not established standards for the various dimensions and physical arrangement of the reducers including, for example, shaft heights from the mounting bases, center to center distance between shafts, mounting hole centers and overall housing dimensions. Even though reducer units of given horsepower ratings among various manufacturers may have been of similar physical size, they have differed in respect of certain dimensions. Consequently, it has been difficult, if not economically impractical, to interchange a reducer of one manufacturer with that of another. Often, a user has had to substantially modify his installation in order to effect such an interchange, thus incurring large costs and/or downtime.

Even in the production of new reducers on the assembly line, the construction of the heretofore typical unit has incurred in some of its portions slow and meticulous labor. For example, blueing or other coloring agents have been used to indicate contact ratio between the worm and wheel because of blind association of parts during the assembly of the units. This plus the alignment of the power shafts and gears have typically required repeated disassembly and reassembly, i.e., trial and error, until manufacturing specifications are met. Such trial and error, of course, affects both the production time and costs.

Any endeavor on the part of the manufacturers and their distributors to maintain an inventory of gear speed reducers adequate to fulfill the specifications in commercial demand has involved a large financial investment in sizeable inventories, inventory controls, and warehouse space. In spite of the variety provided within the standard commercial specifications, there has existed general noninterchangeability between units of various manufacturers, primarily because of nonuniformity of dimensions.

Some manufacturers have built units having an integrally cast pad or mounting feet on both the top and the bottom of the housings to provide universal mounting of the units for worm top or worm bottom models. Then with an additional set of angle iron mounting brackets bolted to the mounting pads, the same units could also be used as vertical shaft models. One disadvantage of this arrangement is that one set of mounting feet or one of the mounting pads is unused in the ultimate installation. Such unused portions represent excess metal in the casting and excess machining of the final product. Moreover, these unused portions may be objectionable in certain industries, such as the food industry, where their structures are subject to becoming collecting areas for contaminants and breeding grounds for bacteria. Even in this type of universal mounting construction, the size of the mounting pads have been fixed in the manufacturing process so that there has been little, if any, dimensional freedom for changing mounting dimensions and shaft heights.

In other instances, it has been known to move in the direction of manufacturing gear speed reducers with dimensional freedom by providing either a base plate or mounting feet made to order and then affixed to the unit. Such construction allows the user to obtain within limits the mounting dimensions and shaft height that he has specified. The user may even elect to make his own base plate or mounting feet. Even this construction, however, has its drawbacks and does not meet the entire need, because the housing to which the separate parts are attached is itself of unchangeable dimensions. Thus, when a user needs a replacement reducer for an obsolete unit, he may still have to completely modify the installation site because a unit having the capability of being a dimensional replacement or being easily made into one is unavailable.

The thermal rating of a gear speed reducer is another important factor. The thermal rating is that horsepower a gear reducer can transmit without reaching an overly high operating temperature. A continuous or even prolonged operation of a reducer when its temperature rise is in excess of a specified amount above ambient tends to accelerate deterioration of component parts and result in shortened life. Speed reducers of the foregoing type have no provision for modifying the thermal rating of a given unit.

It is a primary object of the present invention to provide a gear speed reducer having a construction having several advantages over the heretofore existing commercial reducers of the foregoing general type.

It is a further object of the present invention to provide a gear speed reducer that utilizes standard, commercially available internal component parts rated in accordance with recognized and acceptable standards and practices and that has universal mounting characteristics.

It is yet another object of the present invention to provide a gear speed reducer of the worm gear type having a construction affording maximum dimensional freedom in housing and mounting dimensions.

It is still another object of the present invention to provide a gear speed reducer having a construction affording improved quality of the assembled unit and decreased assembly time of such units.

It is still a further object of the present invention to provide a gear speed reducer having a construction that affords an inventory of reducers that will encompass a variety of specifications and yet at a reduced investment in inventory and warehouse space.

It is still another object of the present invention to provide a gear speed reducer having a construction that simplifies the on-site replacement of increasing worn out or special reducers of various manufacturers.

It is still another object of the present invention to provide a gear speed reducer having a construction that readily lends itself to incresing the thermal capability of any given unit.

These and other objects of the present invention are more particularly set forth in the following detailed description and in the accompanying drawing of which:

For purposes of illustration, the present description is confined to gear speed reducers of the worm gear type, it being understood, however, that the principles of the present invention are not restricted to worm gear speed reducers. It is recognized that gear trains may employ spiral, bevel, or hypoid gears, as well as worm gears, on perpendicular shafts and spur, helical, or herringbone gears on parallel shafts. Also, a gear train may include two or more gears for the transmission of motion from one shaft to another, but the present description is confined, for ease of description and illustration, to a gear train of only two gears.

Figure 1:
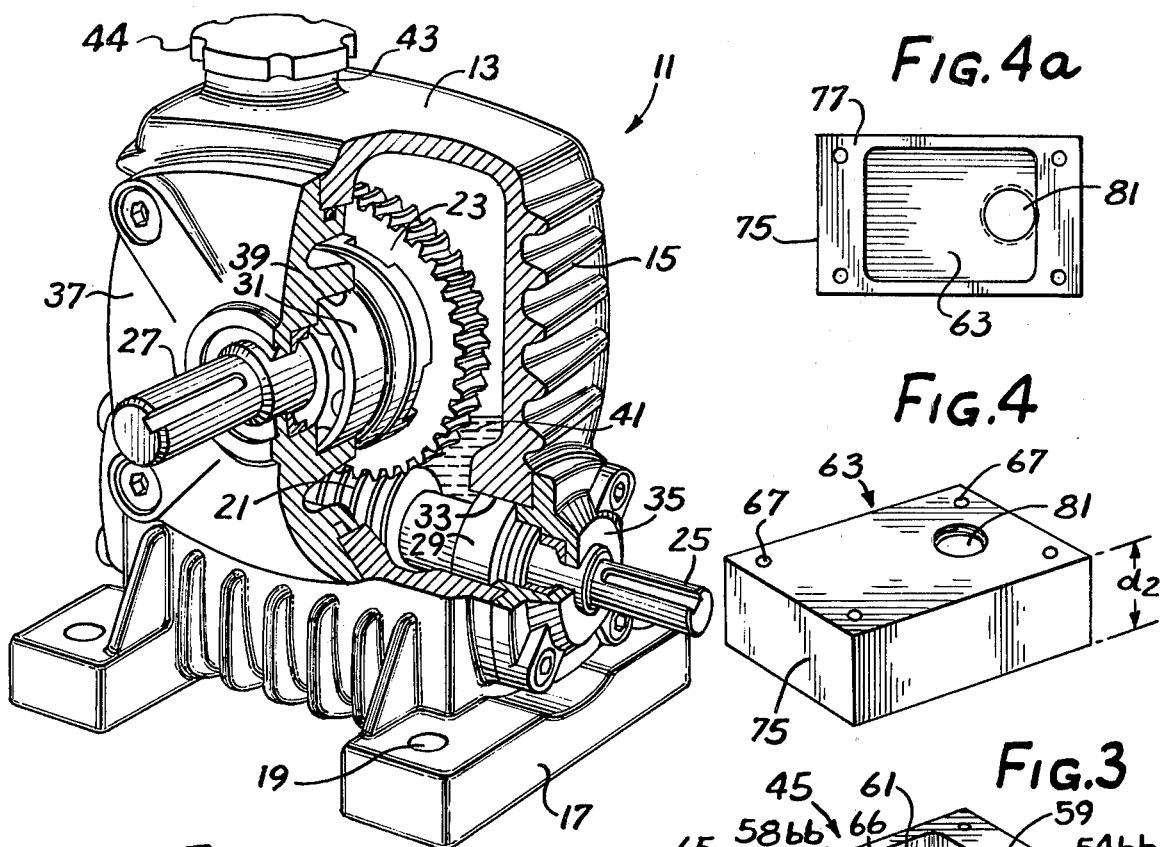
FIG. 1 is a perspective view of a gear speed reducer of the heretofore existing type with portions broken away for the illustration of interior parts.

There is illustrated in FIG. 1, a worm gear speed reducer 11 of the heretofore existing type. This reducer includes a housing 13 having outer walls that are ribbed and form fins 15 to promote cooling. A base 17 having mounting holes 19 therein secures and supports the reducer 11. The housing 13 contains a worm 21 that meshes with a wheel 23. The worm 21 is integral with or mounted in a suitable manner on a worm shaft 25, and the wheel is mounted in a suitable manner on a wheel shaft 27. These shafts are rotatably mounted in bearings 29 and 31, respectively. The bearing 29 is carried in a bearing seat 33 in the housing 13 and is covered by a suitable cap 35 through which the worm shaft 25 passes in extending outside the housing 13.

A suitable cap 37 in a similar fashion is associated with the wheel 23. In this instance, however, its bearing 31 is carried in a seat 39 in the cap 37 that is attached to the housing. Generally, such housings and caps are castings, and these castings are machined in the area to provide the bearing seats. Suitable seals are also provided.

Both the worm shaft 25 and the wheel shaft 27 are journaled at their opposite ends in suitable bearings (not shown) carried in bearing seats machined out of the housing wall. Sometimes, the covers of these opposite bearing seats are not detachable but are an integral part of the housing.

A lubricant 41 serves to both lubricate the moving parts within the housing and to cool the reducer as the lubricant circulates against the inner walls of the housing 13. The walls of the housing 13 thus act as cooling surfaces for the lubricant and transfer heat from the inside of the enclosed unit to the outer atmosphere. A port 43 is provided for filling the reducer with the lubricant 41 to a desired level. A suitable cap 44 for the port 43 is provided to protect against outside contaminants. The cap 44 may also provide a vent for internal pressure relief. Suitable lubricant level gauges and drain plugs (not shown) are also generally provided in appropriate locations.

In operation, a driving means (not shown) is connected to the input or worm shaft 25 to supply power to the unit and a driven machine (not shown) is connected to the wheel shaft 27 to receive the output power of the unit. Connections to the driving means and driven machine are generally effected through conventional means, as by direct coupling, spur gearing, belt or chain drives, and the like.

The reducer illustrated in FIG. 1 is a worm bottom model, and all shafts are in the horizontal plane. Because of the construction of the reducer illustrated in FIG. 1, it will be appreciated that the shaft height center above the undersurface of the base is fixed, the mounting dimensions of the base are fixed, the type of mounting (base) is determined, the model (worm bottom) is determined, and the inside cooling surface of the lubricant reservoir is fixed. Accordingly, a different housing is needed for any one of a shorter shaft height, different mounting dimensions, different type of mounting, different model, or non-standard thermal capacity in an otherwise standard unit. Considering this in view of the aforementioned great variety of operating specifications, the number of housings utilized by a manufacturer to provide those units most used in industry and the number of completely assembled units to be carried in inventory by a distributor to meet the popular market demand for available standard units is greatly compounded. Of course, special units always can be supplied, as heretofore has been done, in those instances where the limitations imposed by the available standard units prevent their use, but a special unit is costly and unavailable for immediate use. The units having the additional mounting facility on the top or the units being adapted to receive mounting feet or plates made to order help this problem some, but not completely. As mentioned previously, the housing casting is of fixed dimensions, and so the cooling surfaces cannot be increased and some of the physical dimensions are unalterable.

Moreover, to assemble the worm and wheel in the housing of the units heretofore known so as to establish a complete meshing of the gears, the bearing retainers 35 and 37 need to be in place, and this closes the entire unit so that there is a blind association of parts. Consequently, the assembler is unable to visually examine the parts alignment and the contact ratio between gears. Because of this blind association of parts, the assembler uses blueing or other coloring agents on the gears and then typically disassembles and reassembles the units in a trial and error fashion several times before reaching a finished product. As described hereinafter, the present invention provides solutions to these problems.

Figures 2, 7:
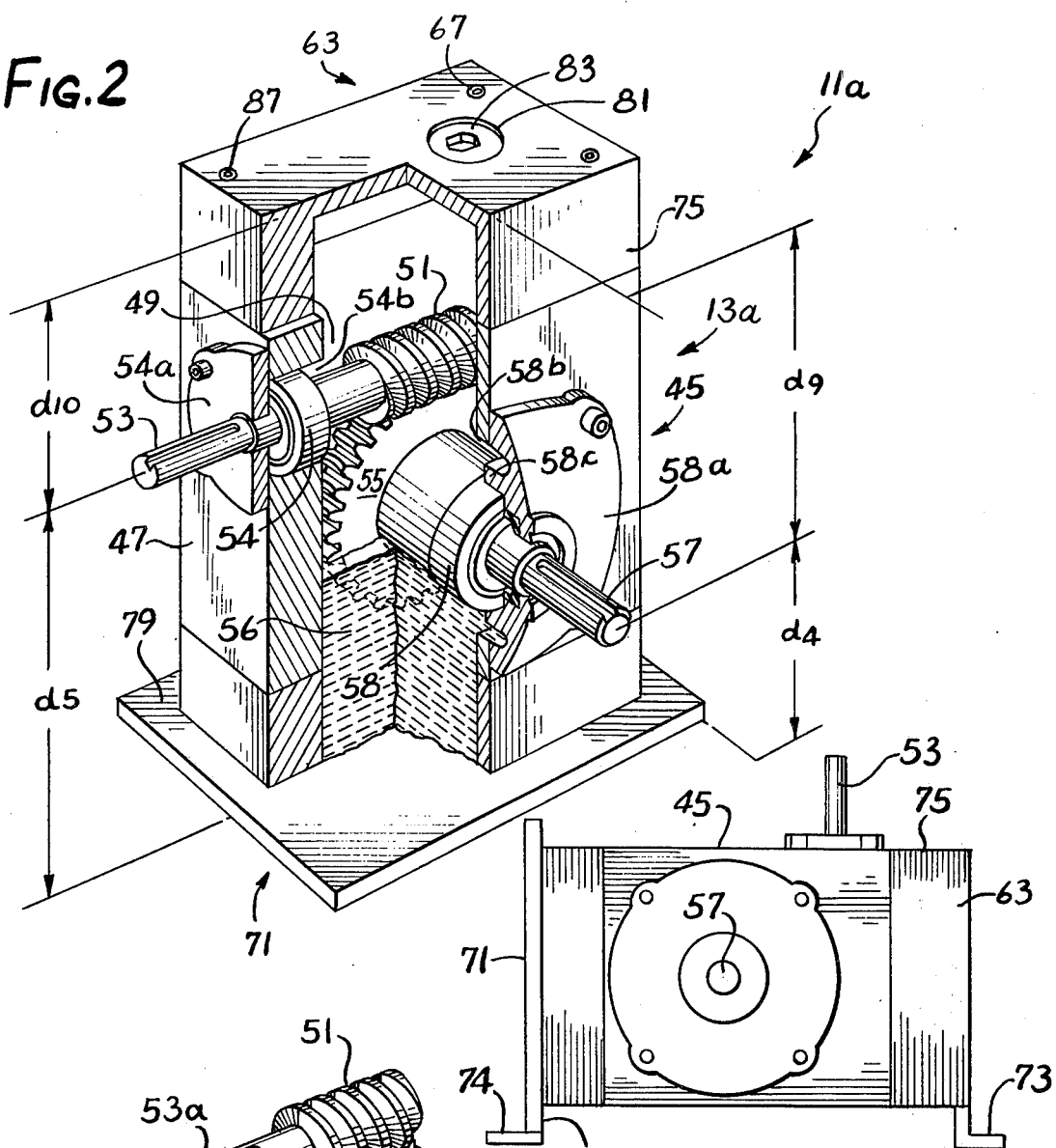
FIG. 2 is a perspective view of a gear speed reducer constructed in accordance with the principles of the present invention with portions broken away for the illustration of interior parts.
FIG. 7 is a side view in elevation of an alternative mounting arrangement of the gear speed reducer of FIG. 2.

A preferred embodiment of the present invention is shown in FIG. 2 in the form of a gear speed reducer 11a. This reducer includes a casing, frame or housing 13a, which is an assembly of primarily three principal parts. Thus, the present invention sets forth an enclosed gear drive having a three piece or modular housing. As will be seen in detail hereinafter, dimensional flexibility, mounting type flexibility and cooling capacity flexibility are all provided in a high production produced body mounting standard gears of horsepower-torque ratings in accordance with standard engineering practice and a minimum of two accessory parts to complete an assembly.

A first and basic principal part of the housing 13a is a body 45 having walls 47 that encompass and define a chamber 49. In the chamber 49 are a worm 51 and a wheel 55 meshing therewith. The worm 51 is integral with or is mounted in a suitable manner on a worm shaft 53 and the wheel 55 is mounted in a suitable manner on a wheel shaft 57. In the preferred embodiment, the worm 51 is generally made of hardened and ground alloy steel and the worm threads are precision ground after cutting. The wheel 55 is generally made of a bronze alloy. Other materials may also be usable for these items.

The worm shaft 53 is rotatably mounted in a bearing 54, and the wheel shaft 57 is rotatably mounted in a bearing 58. These may be conventional friction or antifriction bearings. A cover 54a and a cover 58a are each mounted in a suitable manner, as by socket head screws or the like into blind tapped holes, on the outside of the walls 47 in the region of the respective bearings. Annular openings 54b and 58b (FIG. 3) are provided in the walls 47 as assembly inlets for the worm 51 and the wheel 55 respectively. A peripheral surface 54c (FIG. 3) that defines the annular opening 54b is machined to provide a bearing seat to hold the outer race of the bearing 54. Because the annular opening 58b is substantially larger than the opening 54b to accommodate the wheel that is considerably larger in diameter than the worm, a seat for the bearing 58 preferably is machined out of a boss 58c in the cover 58a rather than having an oversized bearing provided for a seat in the body 45. The shafts 53 and 57 extend outwardly from the body 45 through their respective covers. A suitable lubricant 56 provides both lubrication and cooling for the reducer 11a.

Conventional gaskets, packings, shims, covers, bearing seals, spacers, lubricant level gauges, lubricant drain plugs, and other components typically used in gear speed reducers are also utilized in the reducer 11a to form a complete oiltight housing. It is believed unnecessary to further describe these items, and in the interest of simplifying the illustration of the preferred embodiment, such description is omitted.

Annular openings 54bb and 58bb (FIG. 3) are also provided in the walls 47 of the body 45. These openings correspond to, but oppose, the annular openings 54b and 58b respectively. These opposing pairs of openings are on axes that are normal to but spaced apart from each other to allow for the complete support of the worm shaft 53 and the wheel shaft 57. Either shaft can be double ended and extend both directions out of the body 45. Normally, however, at least one end of each shaft terminates within a bearing, i.e., is coterminous with the walls 47. A cover (not shown) similar to cover 54a, except that it is solid, is utilized to cover the bearing journaling the nonextending end of the worm shaft 53, and another cover (not shown) similar to cover 58a, except that it is solid, is utilized to mount the bearing carrying the nonextending end of the wheel shaft 57. This arrangement of opposing openings in the body 45 is a feature contributing to the body's universal nature. Alternatively, one of these covers related to the nonextending end of the shafts could be cast into the body and become an integral part thereof without losing the universal nature. Accordingly, a given body 45 can be utilized for an assembly wherein the worm shaft is above the wheel shaft, in an assembly wherein the worm shaft is below the wheel shaft, or in an assembly wherein one of the shafts is vertical, and any of the shafts can be double-ended. The illustrated mutual relation of the gears and shafts in FIG. 2 is that of the input shaft above the output shaft, and such a reducer is referred to as a worm top model.

Figure 3:
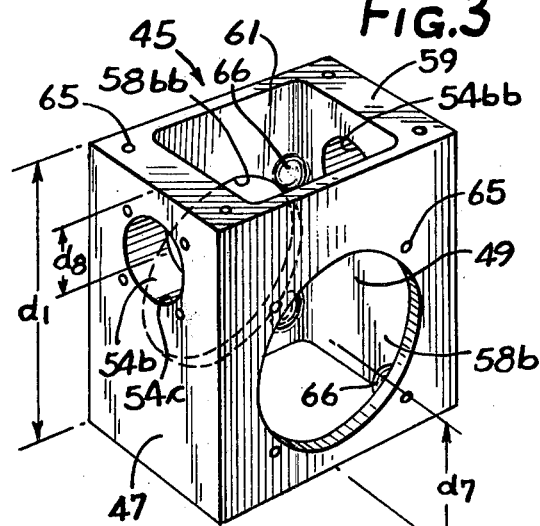
FIG. 3 is a perspective view of a gear speed reducer housing body constructed in accordance with the principles of the present invention for use in the reducer shown in FIG. 2.

For purposes of illustration only, and as best seen in FIG. 3, the walls 47 of the body 45 are in the form of a rectangular shaped box having open opposed ends. Thus, the chamber 49 defined by these walls is also rectanglar, i.e., a cross section of the chamber made by a plane passing through the chamber perpendicular to the walls 47 would be rectangular. The present invention, however, is not restricted to a body of such shape, and the walls could be formed so as to define a chamber having a cross section that is square, circular, or other geometric shape. This body 45 may be a casting or a weldment made of any suitable material, such as metal or plastic or other synthetic material.

Figure 3A:
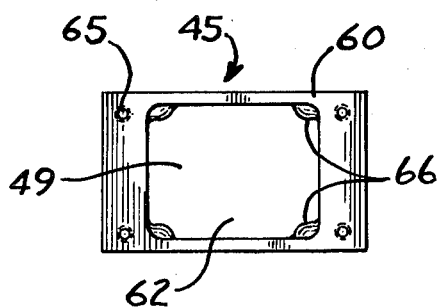
FIG. 3a is an end view of the lower end of the lower end of the body of FIG. 3.

The walls 47 terminate to define interfaces 59 and 60 (FIGS. 3 and 3a) that preferably are machined to provide true flat surfaces. The termination of the walls 47 also define openings 61 and 62 respectively which are in communication with the chamber 49. Preferably, the openings 61 and 62 are so defined as to be of areas substantially equal to the cross sectional area of the chamber 49. Such openings in both ends of the body 45 provide full access, both visually and physically, to the chamber 49 and any component parts therein. Such access is particularly advantageous, as will be seen hereinafter. Blind tapped holes 65 are provided in the body 45 to receive suitable hardware that removably attach various other parts to the body, such as the bearing covers 54a and 58a and other parts described hereinafter. Blind tapped holes are preferred to eliminate the need for seals in these areas. Bosses 66 are provided on the inner surfaces of the relatively thin side walls to provide thereon more body in the areas of these tapped holes so as to accommodate sufficient threads for the attaching hardware.

Returning once again to FIG. 2, a second principal part of the housing 13a is a first end member or cover 63, which preferably is of the same material as that selected for the body 45. Important functions of the cover 63 are to close and seal one of the two open ends of the body 45 and to add wall surface for cooling to increase the thermal capacity of the reducer, as will be described hereinafter. Additionally, the cover may be used to provide a means for mounting other apparatus, such as a motor, to the gear speed reducer 11a.

A third principal part of the housing 13a is a second end member or base 71, likewise preferably made of the same material as the body 45. Important functions of the base 71 are providing a means for mounting the gear speed reducer 11a, providing a means for matching original mounting dimensions, including shaft heights for purposes of replacement, to close and seal the opposite end of the body 45, and to form a lubricant reservoir.

Figure 4A:
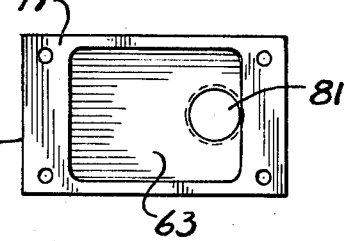
FIG. 4a is a view of the open end of the cover shown in FIG. 4.
Figure 4:
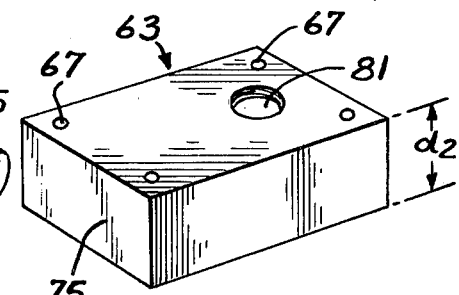
FIG. 4 is a perspective view of a cover for use with the body shown in FIG. 3.
Figure 5:
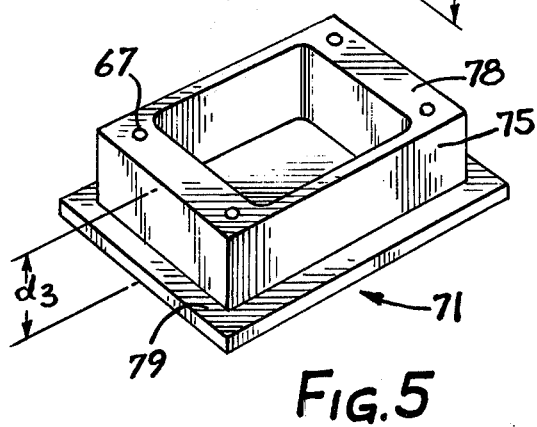
FIG. 5 is a perspective view of a mounting plate or base for use with the body shown in FIG. 3.

Preferably, the cover 63 and the base 71 each include upstanding walls 75 integrally associated with one of the faces thereof, as best illustrated in FIGS. 4, 4a and 5. Upon examining FIGS. 4a and 5, it will be seen that these upstanding walls 75 form a shape on each part corresponding to that of the body 45. Further, the upstanding walls 75 of the cover 63 define a flat interface 77 at the termination of their open ends. In like manner, the upstanding walls 75 of the base 71 define a flat interface 78 at the termination of their open ends. These interfaces 77 and 78 are preferably machined to provide true surfaces to complement the interfaces 59 and 60 respectively of the body 45 for forming oiltight seals at the junctions thereof. Alternatively, gaskets, shims, packings or other types of sealers or adhesives may be disposed at each junction between the interfaces to form an oiltight seal and to increase rigidity of the entire housing assembly.

As may be seen in FIG. 5, the base 71 is provided with a mounting border 79 which extends in all directions beyond the limits of the walls 75. This mounting border 79 is uninterrupted by openings of any kind allowing latitude in mounting the reducer 11a, as will be described in more detail hereinafter. Although the border is shown as being rectangular, it is not intended that the border be limited to this shape. It could be in a form that would provide mounting surfaces near the four corners with narrow border portions along the sides and ends intermediate the corners, which would decrease the amount of metal, decrease the weight, and provide a different appearance.

The cover 63 and the base 71 are each removably attached to the body 45 on the interfaces 59 and 60 respectively by suitable attaching hardware, as for example, socket head bolts 87 (FIG. 2) tightened in the tapped blind holes 65 in the ends of the body walls 47 (FIGS. 3 and 3a) through corresponding bolt clearance holes 67 in the cover 63 and base 71. The holes 67 in both of these end members preferably are counterbored to contain the heads of the socket head bolts so as to provide a flush outer surface on the ends of the reducer 11a for ease of mounting same. Other suitable attaching means could also be utilized.

Although the foregoing described the base 71 as mounted on the body interface 60 and the cover 63 as mounted on the body interface 59, it should be understood that both the cover 63 and the base 71 can be mounted on either body interface and thus mount the reducer 11a by either of its ends, either in a base mounting position or a top suspension position. Moreover, the body can be reversed with respect to the cover and base to provide either a worm top or worm bottom model. Also, a base 71 could be applied to both ends of the body if in a particular instance such would be desirable.

Figure 8:
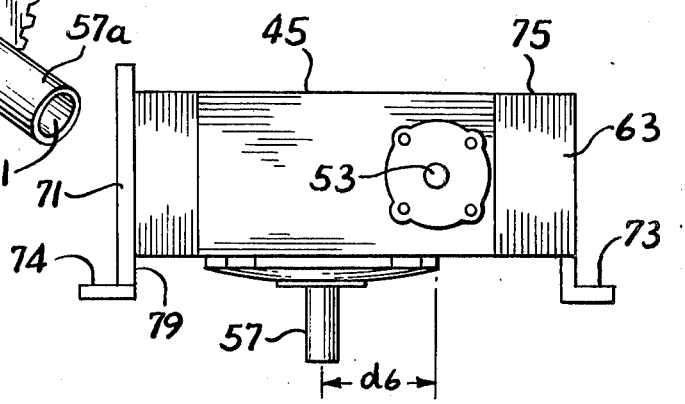
FIG. 8 is a side view in elevation of a variation of the mounting arrangement of the gear speed reducer of FIG. 7.

Other relationships between the input and output shafts are also possible, as best illustrated in FIGS. 7 and 8, by the addition of a mounting foot 73 or a mounting foot 74, as appropriate, to the end members. The mounting foot 73 is a right angle member that is either attached to or integrally associated with the top peripheral portion of the cover 63, and the mounting foot 74 is a flat member attached to or integrally associated with, and extending at an angle from, the edge of the mounting border 79 of the base. Preferably, either type of foot extends from the periphery of either of two adjoining side edges of the part of which it is an appendage. Alternatively, the end members could have feet extending from the periphery of two adjoining side edges and thus enhance the universal nature of these parts. Thus, these mounting feet may be used to effect a relationship of the shafts 53 and 57 where either shaft is vertical and directed either upwardly or downwardly as required by selecting the appropriate mounting feet.

As mentioned previously, the upstanding walls 75 of the end members, as best seen in FIG. 2, effectively extend the walls 47 of the body and increases the entire housing wall surface area accordingly. Such is particularly advantageous for increasing the thermal rating of the reducer 11a.

There are always some losses in power transmission that are manifested in heat. Because of this, a gear speed reducer also has a thermal rating, and this rating relates to the amount of horsepower that the unit can transmit in continuous operation without excessive temperature rise. This thermal horsepower rating may be either higher or lower than the mechanical horsepower rating of the reducer. To avoid the thermal rating becoming a restricting factor in a given installation, the present invention provides for increasing the thermal rating of a given reducer in the following manner.

The thermal rating of a reducer generally depends on the thermal radiating capability of the individual housing, which is a function of the surface area of the housing walls. By assembling a reducer in a housing having a relatively high thermal radiating capability, i.e., relatively high wall surface, a reducer may be made suitable for replacing original equipment having a particularly high reduction ratio, wherein efficiency drops off and thermal energy generation increases, and/or located in an abnormally high ambient temperature situation. Thus, one criteria for the length of the combined upstanding walls 75 is the amount of wall surface needed for the required thermal radiating capability.

Further in accordance with the present invention, the upstanding walls 75 of the end members are used to control the height of the shaft centers from the mounting surface and the overall height of the total unit. Thus, the shaft height of a replacement unit may be made to match the shaft height of original equipment or the height can be altered to meet headroom restrictions.

The modular concept of the housing 13a as described herein provides an advantageous dimensional freedom in a manner best described in reference to the drawings. In FIG. 3 "$d$" refers to the length from end to end of the body 45, "$d7$" refers to distance of the center of the annular opening 58b to the interface 60, and "$d8$" refers to the distance of the center of the annular opening 54b to the interface 59. In FIG. 4, "$d2$" refers to the overall height of the cover 63 including the length of the upstanding wall 75. In FIG. 5 "$d3$" refers to the overall height of the base 79 from the undersurface thereof and including the length of the upstanding walls 75. In FIG. 2 "$d4$" refers to the distance of the wheel shaft center to the mounting surface, "$d5$" refers to the distance of the worm shaft center to the mounting surface, "$d9$" refers to the distance of the wheel shaft center to the end surface of the cover, and "$d10$" refers to the distance of the worm shaft center to the end surface of the cover. In FIG. 8 "$d6$" refers to the center to center distance of the wheel shaft 57 to the worm shaft 53.

Referring now to FIG. 2, as mentioned previously the worm 51 and the wheel 55 and their associated shafts, bearings, seals, and covers are all contained in the body 45. It is contemplated that for a given center distance "$d6$" (FIG. 8) that the body 45 will be made as small as possible consistent with a mechanically sound structure in accordance with acceptable engineering practice. Thus, in accordance with the invention, it is contemplated that the body 45 with the assembled parts would be a repetitively produced, completed assembly, i.e., mass produced, and be carried in inventory as an immediately available item. It is further contemplated that the cover 63 and the base 71 will be provided as accessory items which, for example, could be carried in inventory as unmachined parts.

This concept provides the advantage of special made units at greatly reduced costs. The body 45 becomes the foundational part on which the accessories are applied to provide the desired complete unit. The body 45 and the internal components form the heart and the most expensive portion of a completed unit. The higher production rate of this portion reduces its cost. Hence, the final cost of a completed unit is much less than a heretofore specially made unit for a given size.

The base 71, as mentioned previously, can be applied to form either the bottom of the reducer for a standard base mounting type or the top of the reducer for a suspended mounting type. The mounting border 79 of the base 71 can be made of any appropriate size or shape for effecting any desired mounting hole pattern. Further, longer upstanding walls 75 of the base 71 (increased distance "$d3$") can be utilized to increase distances "$d4$" and "$d5$". These walls 75 also can be machined to decrease "$d3$" and the distances "$d4$" and "$d5$" or the distance from the mounting surface to any other fixed point on the housing. Furthermore, the distance "$d7$" can similarly be increased or decreased with a corresponding effect upon distances "$d4$" and "$d5$".

Similarly, increasing or decreasing distances "$d2$" or "$d8$", or a combination thereof, will cause a corresponding increase or decrease in distances "$d9$" and "$d10$". Holding a constant "$d6$", a change in either distances "$d7$" or "$d8$" will affect distance "$d1$".

The base 71 and the cover 63 are both relatively simple structures and of lower cost when compared with the complete gear reducer 11a. Machining of the parts with standard machines and procedures provides the kind of design freedom that allows one to duplicate critical dimensions of other reducers. Users of the reducers are thus assured of a replacement for an obsolete reducer without having to make expensive installation changes because of an identical replacement no longer being available. Thus, by combining appropriate accessory parts to the assembled body 45, a unit can be provided to the user's specifications, and the user is not forced to adapt his present installation to some kind of fixed dimensioned unit.

The cover 63 is also used as a variable dimension part to be used to increase the surface area for additional cooling capacity of the unit, as mentioned previously. Additionally, the cover can be used for attaching other equipment that might be used in the installation. Thus, the socket heads of the bolts 87 securing the cover to the body fit within the recesses in the holes 67 to also provide a flush-mounting surface at the end of the reducer 11a.

The illustrated cover 63 is also provided with a port 81 (FIGS. 2 and 4) for the filling of the chamber 49 with the lubricant 56 to a desired level. A suitable recessed cap 83 is provided to close the port 81 in a flush-mounting manner to free the outside surface of impediments for mounting purposes. Such a port could also be provided in the base 71. As mentioned previously, the bolt holes 67 provided in the cover 63 for removably attaching the cover to the body 45 preferably are counter-bored to provide recesses therein.

Figure 6:
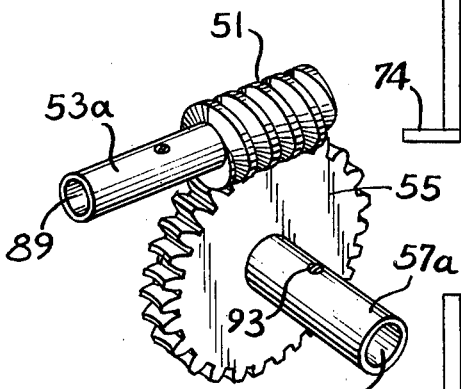
FIG. 6 is a perspective view of a worm and wheel gear train with an alternative shaft construction.

As mentioned previously, the input shaft 53 and the output shaft 57 extend outside the housing 45 and are coupled to driving and driven devices, respectively. Alternatively, the shafts may either or both be provided as indicated in FIG. 6 wherein the shafts 53a and 57a are short and hollow. The shafts 53a and 57a contain bores 89 and 91 respectively for receiving shafts in a telescoping manner from the driving and/or driven devices. Set screws 93 are provided to secure the inner shafts. Of course, means other than the set screws 93 could be utilized for interlocking telescoping shafts, such as conventional keys or pins. This alternative arrangement of shafts permits the housing 45 to be used as a support for mounting the driving source, such as an electric motor, and/or the driven apparatus. Suitable mounting adapters may be required in these instances.

It should be understood that although both shafts are shown hollow and short in FIG. 6, the arrangement could include a combination where either one is hollow and short and the other is solid and extended. Further, this could be combined with the double-end forms described previously.

In the assembly of the gear speed reducer 11a, a worm and a wheel having the appropriate ratio respectively of worm threads and teeth to accomplish the desired speed reduction is mounted in the chamber 49 of a body 45 along with the necessary mounting components, such as bearings, bearing seals, packing, caps, etc. The body 45, having both ends open, provides complete visual and physical access to the gears for purposes of aligning the shafts and adusting the contact ratio of the worm and wheel. All adjustments are then made to the mounted parts and the bearing covers are applied and sealed.

Where the purpose of assembly of the reducer is the preparation of a unit for replacement in an existing installation, the assembler would proceed to close the body 45 by selecting a base 71 in accordance with the conditions of the installation with a view of matching the important dimensions of the original equipment, such as the shaft center heights and the mounting hole center dimensions. The existing mounting hole location and center dimension pattern is made and transferred to the selected base 71, and then the mounting holes are made. If the shaft heights are non-standard, the upstanding walls of the base are machined as required to cause the replacement unit to match in shaft heights. The base 71 is then attached to the body 45.

It should be noted that the mounting border 79 of the base 71 is plain. There are no pre-arranged mounting holes, although in production models, such pre-arranged mounting holes could be provided. The plain borders facilitate matching the dimensions of reducers made by various manufacturers, particularly for replacement purposes.

A cover 63 is then selected to complete the assembly of the reducer 11a for replacement. The primary consideration in selecting the closure member is the thermal rating needed for the replacement unit in view of the gear ratio, the mechanical horsepower rating of the reducer and the ambient temperature at the installation site. The upstanding walls of the cover are machined as necessary. If overhead clearance is not a restricting factor at the installation site, a closure member with upstanding walls could be applied without cutting down the walls by machining. The cover 63 is then attached to the body 45.

If either the input or the output shaft is to be vertical, then in accordance with the previous description, a cover 63 and a base 71 having feet 73 and 74 respectively are selected for the assembly.

Upon attaching both ends, seals are formed at the junction of the interfaces to contain the lubricant within the housing and to seal out foreign matter. The lubricant 56 is then added through the port 81 as needed and the port is closed by the cap 83. Of course, the adding of this lubricant can be done at the job site, if preferred. A suitable lubrication level indicator (not shown) and a suitable drain plug conveniently located for the purpose (not shown) are provided for checking the lubrication level and draining and refilling as required.

The replacement reducer 11a made to match the original equipment is then installed with a minimum of time and effort.

The construction of the illustrated embodiment 11a provides many advantages over that of the heretofore existing reducers. As has been seen, there is dimensional latitude that facilitates matching equipment made by various manufacturers and eliminates the need for extensive modifications when replacing original or otherwise worn out equipment. Moreover, the construction of the illustrated housing, including its modular form, affords incorporating therein standard and commercialy available gears, worms, wheels, bearings, seals, spacers, etc., while providing overall unit interchangeability. Moreover, an inventory of reducers for new and general use can be effected in accordance with recognized and acceptable industry ratings and practices by employing the principles of the present invention.

The dimensional freedom of the housing has been attained by using accessory parts removably attached to a standard body. The same body is usable for matching specifications requiring the input shaft to be above the output shaft, the input shaft to be below the output shaft, or one of the shafts mounted vertically. Accordingly, fewer standard parts are needed to meet the specifications of many different reducers made by various manufacturers. Furthermore, the present construction affords reduced assembly time and better quality of the final assembled unit, because the assembler has visual access to the component parts during the assembly. Thus, reducers are provided more economically than heretofore possible by the reduced assembly time and the reduced assemby costs. Moreover, a reduction of investment in inventory and warehouse space is effected.

A further advantage of the present construction is that special purpose reducers custom built to specification are feasible for machines otherwise restricted to generally available units. Because of the dimensional freedom, there is ease of matching dimensions of either obsolete reducers or of special purpose reducers, including shaft heights and mounting dimensions.

The present construction also facilitates increasing the thermal capabilities of a reducer for any given fixed center and mechanical horsepower rating.

Summarizing, there has been provided a gear speed reducer and an improved housing construction therefor that includes a modular form having a plurality of principal parts; namely a body 45, a cover 63, and a base 71. The body 45 defines a chamber 49 that contains the gear train and power transmission shafts. The arrangement is such that a given body when assembled provides any of a worm top model, a worm bottom model, or a vertical shaft model. The ends of the body 45 are open, providing visual and physical access to the internal components during assembly.

The cover 63 and the base 71 are removably attachable to the body 45 at the open ends to close the ends and seal the junction between the interfaces of the parts. The base 71 is provided with a mounting border free of mounting holes, providing latitude in matching predetermined mounting dimensions. It can be applied to either end of the body 45 to provide a base mounting type unit or a suspended mounting type unit as applicable.

The present invention further contemplates that the cover 63 and the base 71 includes, integrally with one face thereof, upstanding walls forming the same general shape as the walls of the body 45. These walls are machinable to a desired height to facilitate matching dimensions of existing units having shafts at predetermined heights above the mounting surfaces and/or to extend the surface area of the housing walls a predetermined amount for obtaining proper heat dissipation.

The present invention further contemplates mounting feet integrally associated with one side of either or both the cover 63 and the base 71, or adjoining sides thereof, for mounting the reducer so as to dispose one of the power transmission shafts vertically. The power transmission shafts may be either solid and extend from the body or hollow and coterminous with the body.

The illustrated combination provides many advantages that include interchangeability of mounting while retaining the use of commercially available component parts and center distances between gear train shafts rated in accordance with recognized and acceptable standards and engineering practices. Such construction also allows the use of fewer housing parts to effect an adequate stock of marketable reducers, and at the same time permits assembly of the reducers with improved quality and with less costs. Moreover, the illustrated construction permits more than one model to be assembled from a given body, resulting in reduced investment needed in inventory and warehouse space. Universal mounting features facilitate on-site replacement of obsolete, worn out or special reducers. The illustrated construction also readily lends itself to increasing the thermal capability of any given reducer.

Although the invention has been described in connection with a preferred emobodiment, many alternatives modifications, and variations may become apparent to those skilled in the art in view of the foregoing description. Accordingly, it is intended to embrace all such alternatives, modifications, and variations as fall within the spirit and scope of the appended claims.

Various features of the invention are set forth in the following claims.

What is claimed is:

1. A gear speed reducer comprising a gear train a plurality of power transmission shafts associated with said gear train; a housing body having walls defining a chamber containing said gear train and shafts, said walls having openings therein through which the shafts extend, said housing body also having two further openings communicating with said chamber other than any of the shaft openings, said further openings being defined respectively by opposing ends of said walls and in parallel planes normal to said walls, said further openings having respective areas substantially equal to the cross sectional area of said chamber taken in a plane normal to said walls, each of said opposing ends of the walls providing a sealable interface for said body about one of said further openings; a first end member for mounting said reducer, said first end member having a mounting plate and an interfacial portion complementing both of the sealable body interfaces and being removably attached to said body on one of the interfaces, forming an oiltight seal thereat and closing the end of the body associated therewith; and a second end member having an interfacial portion complementing both of the sealable body interfaces and being removably attached to said body on the other of the interfaces, forming an oiltight seal thereat and closing the end of the body associated therewith, whereby assembly of the gear train within the chamber is facilitated and the size of said housing body can be minimized for a given distance between said shafts independently of the mounting dimensions and thermal rating of the gear speed reducer.

2. A gear speed reducer in accordance with claim 1 wherein at least one of said first and second end members includes integral upstanding walls on one face thereof, said upstanding walls forming a shape corresponding to that formed by the walls of said body, and said upstanding walls terminating at their open end in said interfacial portion complementary to both of said body interfaces and forming a seal therewith.

3. A gear speed reducer in accordance with claim 1 wherein said first end member for mounting said reducer includes a mounting foot extending at an angle to the plane of said mounting plate from the periphery of at least one edge thereof.

4. A gear speed reducer in accordance with claim 1 wherein said gear train comprises a worm and wheel and said body walls contain two pairs of opposing shaft openings, one pair for accommodating the shaft associated with said worm and the other pair for accommodating the shaft associated with said wheel, the opposing shaft openings of each pair being alike and located in the walls such that the axes of each pair of shaft openings are perpendicular to but spaced apart from each other to provide said body with a universal nature.

* * * * *

UNITED STATES PATENT AND TRADEMARK OFFICE
CERTIFICATE OF CORRECTION

PATENT NO. : 4,020,715
DATED : May 3, 1977
INVENTOR(S) : Merle L. Sollars

It is certified that error appears in the above-identified patent and that said Letters Patent are hereby corrected as shown below:

Column 3, line 65, "increasing" should be --obsolete,--.
Column 4, line 1, "incresing" should be --increasing--.
Column 4, line 17, delete "of the lower end", first occurrence.
Column 6, line 55, insert a space between "preferred embodiment".
Column 9, line 51, "d" should be --dl--.
Column 10, line 48, after "gear" insert --drive--.
Column 11, line 42, "adusting" should be --adjusting--.
Column 11, line 64, after "the" insert --mounting--.
Column 12, line 38, "commercialy" should be --commercially--.
Column 12, line 59, "assemby" should be --assembly--.
Column 13, line 58, "emobodiment" should be --embodiment--.
Column 13, line 59, after "tives" insert a comma (,).
Column 14, line 6, Claim 1, after "train" insert a comma (,).

Signed and Sealed this

First Day of November 1977

[SEAL]

Attest:

RUTH C. MASON
Attesting Officer

LUTRELLE F. PARKER
Acting Commissioner of Patents and Trademarks